(12) United States Patent
Benenson

(10) Patent No.: US 7,991,833 B2
(45) Date of Patent: Aug. 2, 2011

(54) USER INTERFACE FOR PROJECTION DEVICE REMOTE CONTROL

(75) Inventor: Alexander Benenson, Salem, OR (US)

(73) Assignee: Seiko Epson Corporation, Tokyo (JP)

( * ) Notice: Subject to any disclaimer, the term of this patent is extended or adjusted under 35 U.S.C. 154(b) by 307 days.

(21) Appl. No.: 12/258,274

(22) Filed: Oct. 24, 2008

(65) Prior Publication Data

US 2010/0107018 A1 Apr. 29, 2010

(51) Int. Cl.
*G06F 15/16* (2006.01)
(52) U.S. Cl. .......................... 709/203; 709/217
(58) Field of Classification Search .......... 709/201–207, 709/217–232
See application file for complete search history.

(56) References Cited

U.S. PATENT DOCUMENTS

| | | | |
|---|---|---|---|
| 7,197,562 B2* | 3/2007 | Murtha et al. ............... | 709/224 |
| 7,397,476 B2 | 7/2008 | Akaiwa et al. | |
| 7,667,704 B2* | 2/2010 | Hogle ............................ | 345/473 |
| 7,716,273 B2* | 5/2010 | Soin et al. ..................... | 709/203 |
| 2003/0191836 A1* | 10/2003 | Murtha et al. ................. | 709/224 |
| 2003/0234809 A1* | 12/2003 | Parker et al. .................. | 345/740 |
| 2005/0091302 A1* | 4/2005 | Soin et al. ..................... | 709/200 |
| 2007/0016653 A1* | 1/2007 | Larsen et al. ................. | 709/217 |

\* cited by examiner

*Primary Examiner* — Yasin Barqadle
(74) *Attorney, Agent, or Firm* — Kilpatrick Townsend & Stockton LLP

(57) ABSTRACT

A projection device is provided. The projection device includes a server subsystem configured to generate a projection-device-status user interface presentable to a remote client via a webpage served by the server subsystem. The server subsystem includes: a projection control module configured to adjust a projection setting of the projection device based on control input received from the remote client via the projection-device-status user interface, and a task scheduling module configured to schedule a projection device operation control task to be performed at a scheduled event specified by scheduling input received from the remote client via the projection-device-status user interface, and to automatically initiate the projection device operation control task responsive to occurrence of the scheduled event.

23 Claims, 18 Drawing Sheets

FIG. 10

PROJECTION-DEVICE-STATUS USER INTERFACE 132

402
LOGGED ON TO: INP 123
MODEL NO.: 1616
SERIAL NO.: 0123456789

CONTROL PANEL 404
PROJECTION CONTROLS
EVENT NOTIFICATION
SCHEDULED TASKS
COMMUNICATION LOG
SECURITY SETTINGS

| E-MAIL SETTINGS 902 | REMINDERS 904 | WARNINGS & ERRORS 906 |

1002
TYPE ☑
☑ PROJECTOR GENERAL STATUS
☑ CLEAN LAMP SCREEN REMINDER
☑ REPLACE LAMP REMINDER
☑ LAMP LIFETIME EXCEEDED REMINDER
☑ WARRANTY EXPIRED REMINDER

1004
SCHEDULE
SENT: 48 ☑ HOURS
SENT EVERY: 4 ☑ WEEKS
SENT WHEN REMAINING LAMP LIFETIME IS LESS THAN: 500 ☑ HOURS
SENT WHEN LAMP HOURS EXCEED LAMP LIFETIME
SENT ON: JANUARY ☑ 1 ☑ 2008 ☑

DEFAULTS

LOG OFF     REFRESH

USER INTERFACE FOR PROJECTION DEVICE REMOTE CONTROL

BACKGROUND

Multimedia projection devices have become popular for purposes such as conducting sales demonstrations, business meetings, classroom training, and various other applications. Due to their popularity, projection devices may be placed in many different locations so that different audiences may view various multimedia presentations without having to wait for availability of a projection device. Moreover, by placing projection devices in different locations, a particular audience may avoid the inconvenience of moving locations to congregate in a viewing area to watch a presentation. As an example, a projection device may be placed in every classroom in a school so that each class may have a projection device to use for multimedia presentations and the like.

Furthermore, a projection device may require setup for operation and maintenance to sustain operation. For example, setup of a projection device may include initializing a projection device for a multimedia presentation. The initialization process may include turning the projection device on and setting the video input to a specific source. An example of maintenance may include determining the number of hours a projection lamp has been used in order to estimate the date when it will need to be replaced. When dealing with a plurality of projection devices in different locations, it may be cumbersome to go the physical location of each projection device to check the status of each projection device as well as perform setup and maintenance tasks.

What is needed is a way to control a projection device and view the status of a projection device over a pre-existing network. This may enable convenient monitoring and control of a plurality of projection devices from a single location that is not required to be in proximity to the projection devices.

SUMMARY

A projection device is provided. The projection device includes a server subsystem configured to generate a projection-device-status user interface presentable to a remote client via a webpage served by the server subsystem. The server subsystem includes: a projection control module configured to adjust a projection setting of the projection device based on control input received from the remote client via the projection-device-status user interface, and a task scheduling module configured to schedule a projection device operation control task to be performed at a scheduled event specified by scheduling input received from the remote client via the projection-device-status user interface, and to automatically initiate the projection device operation control task responsive to occurrence of the scheduled event.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 10 shows an example event notification reminders view of a projection-device-status user interface that may be served to a remote client to remotely control a projection device.

DETAILED DESCRIPTION

Figure 1:
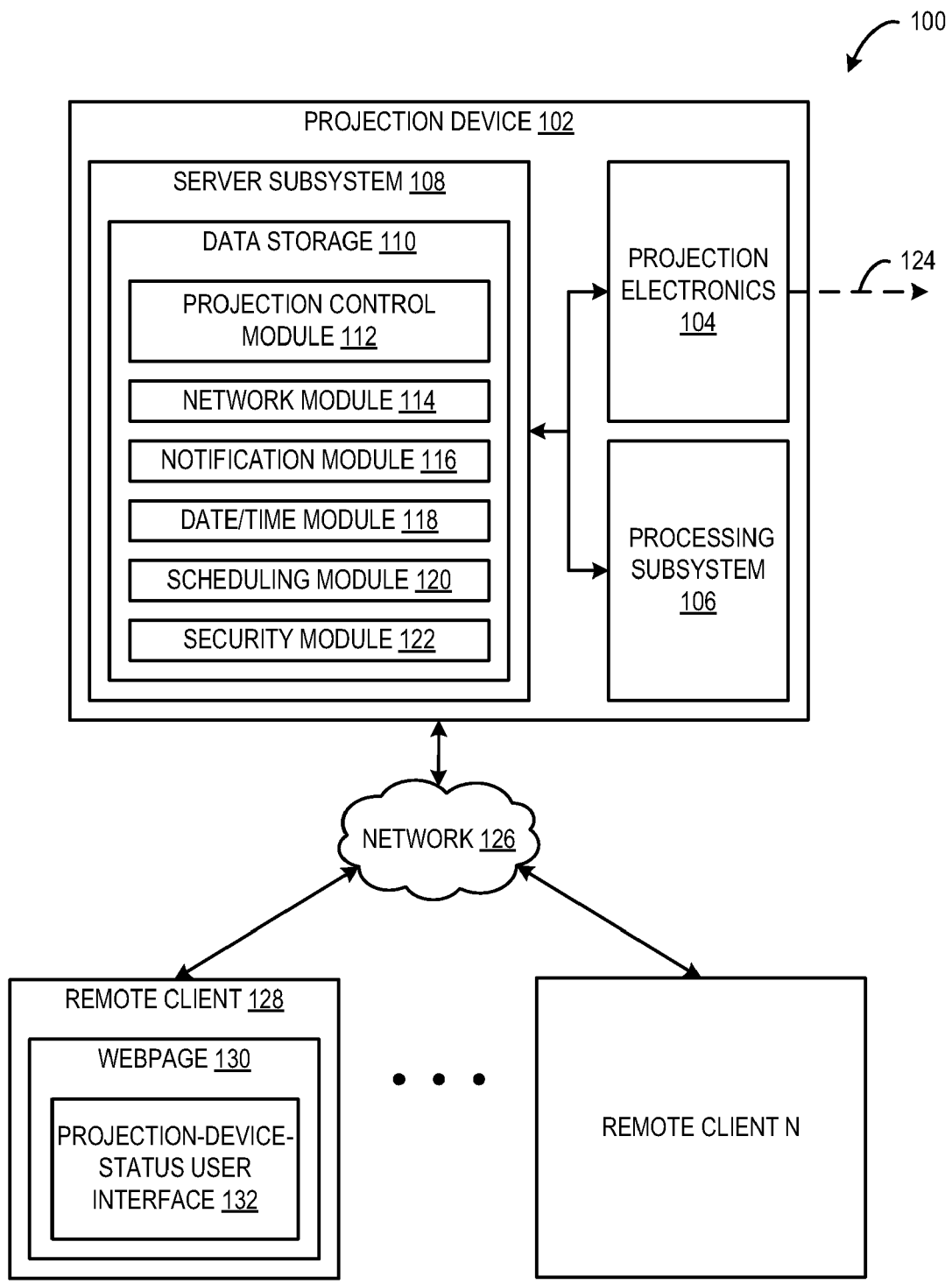
FIG. 1 shows an exemplary embodiment of a projection system of the present disclosure.

FIG. 1 schematically shows an embodiment of projection system 100 in accordance with the present disclosure. Projection system 100 may include a projection device 102.

Projection device 102 may be virtually any suitable display device, including, but not limited to, a front projection device that projects an image onto a remote display, or a rear projection device that projects an image onto a display integrated into the projection device.

Projection device 102 may include projection electronics 104 configured to receive image data from a video source and process the image data to generate a projected image 124. In one example, projection electronics 104 include a light source (e.g., a lamp) that directs light through an image generation device (e.g., a light valve, a digital micromirror device (DMD), etc.). The image generation device utilizes the image data received from the video source to manipulate the light from the light source to form an image. Once formed, the image is routed through optics (e.g., lens) so that the image is suitable for projection.

Projection device 102 may be in electronic communication with one or more client devices 128 via network 126. Network 126 may facilitate wired and/or wireless communication between client devices connected to the network. Further, network 126 may include various interconnected networking devices that facilitate communication. It will be appreciated that network 126 may, for example, include a local area network (LAN) and/or a wide area network (WAN), such as the Internet.

Projection device 102 may be configured to be controlled remotely by a remote client 128 via network 126. In particular, projection device 102 may include server subsystem 108 configured to generate webpage(s) that may be served to authorized requesting clients via network 126, such as remote client 128. Webpage 130 may include a projection-device-status user interface 132 that may present projection device status information and allow for client input to remotely control projection device 102. A remote client may login to a projection-device-status user interface of a specified projection device via projection device login view 300 (See FIG. 3) to remotely control the specified projection device. It will be appreciated that projection-device-status user interface 132 may be presented to a plurality of remote clients (e.g., remote client 128 and remote client N) for remote control of projection device 102 at multiple locations as well as other projection devices in communication with network 126.

Server subsystem 108 may include modules to control projection device settings and operation based on client input received via operation-specific views of projection-device-status user interface 132. Projection control module 112 may be configured to adjust an operation state of projection device 102 as well as change projection device setup and picture settings based on client input received via views of projection-device-status user interface 132 corresponding to projector controls. Further projection control module 112 may provide projection device status and service information for presentation via the views of projection-device-status user interface 132 corresponding to projector controls. Examples of operation-specific views of projection-device-status user interface 132 corresponding to projection device control with which projection control module 112 may interact will be discussed in further detail below with reference to FIGS. 4-8.

Network module 114 may be configured to adjust network connection settings of projection device 102 based on client input received via operation-specific views of projection-device-status user interface 132 corresponding to network connection status and settings. In particular, network module 114 may be configured to selectively obtain an internet protocol (IP) address to connect projection device 102 to network 126 based on remote client input. On the other hand, remote client input may specify an IP address, a netmask, a gateway, a DNS server, and/or a WINS sever through which projection device 102 may connect to network 126. Further, network module 114 may be configured to save/load a network connection configuration based on remote client input.

Notification module 116 may be configured to generate and send a notification, via electronic mail, to an address of a recipient designated by remote client input via the projection-device-status user interface 132 in response to a client specified notification event. For example, a client specified notification event may include initiation of a scheduled operation control task, reaching a threshold of hours of operation of a projection device lamp, expiration of a warranty, projection device component failure, etc. The notification may include event-specific information and projection device status information. For example, a reminder type notification indicating that a lamp bulb needs to be replaced may include the number of hours that the bulb has been operational as well as the current operating status of the projection device (e.g., the projection device is turned on). By notifying a recipient of projection device operation and status at a remote location, projection device operation and status may be monitored without being in proximity to the projection device. As such, the operation of one or more projection devices may be managed from a centralized location. Examples of operation-specific views of projection-device-status user interface 132 corresponding to notifications that may be sent to recipients responsive to certain events associated with operation of projection device 102 with which notification module 114 may interact will be discussed in further detail below with reference to FIGS. 9-11 and 13.

Date/time module 118 may be configured to synchronize the time and date settings of projection device 102 with a client designated time server according to a client specified frequency, such as every 30 minutes. In one example, remote client input specifies a simple network time protocol (SNTP) server and connection port to which date/time module 118 synchronizes to receive a time and date for projection device 102. Further, remote client input may specify a time zone to which projection device 102 may be synchronized by date/time module 118.

Scheduling module 120 may be configured to automatically initiate a projection device operation control task based on scheduling input received from the remote client via projection-device-status user interface 132. Scheduling input may include a time and frequency at which a task may be performed. In some cases, an operation control task may include a plurality of operation control commands. In such cases, scheduling input may include a sequence in which the operation control commands may be performed.

As an example, a projection device initialization task may have a sequence of projection device operation commands that includes first powering-on the projection device and then setting the video source as specified by remote client scheduling input. The projection device initialization task may be scheduled to be repeatedly performed by the scheduling module. In particular, remote client scheduling input may specify that the task be performed every Monday at 9:00 AM. Accordingly, the scheduling module may initiate the projection device initialization task at 9:00 AM every Monday by first powering-on the projection device and then setting the video source as specified by the scheduling input. By enabling projection device operation control tasks to be scheduled repeatedly from a remote client, projection device operation maintenance may be performed without being in proximity to the projection device and at times when the operation maintenance does not interfere with use of the projection device. Moreover, remote task scheduling of a projection device may be expanded to include managing a plurality of projection devices from a centralized location. An example operation-specific view of projection-device-status user interface 132 corresponding to scheduling of operation control tasks of projection device 102 with which scheduling module 120 may interact will be discussed in further detail below with reference to FIG. 12.

Security module 122 may be configured to adjust access to and/or control of certain operation-specific views of projection-device-status user interface 132 as well as certain projection device settings. In particular, security module 122 may be configured to adjust access to at least some operation-specific views and settings that may be presented to a basic user based on input from an administrative level user. For example, security module 122 may selectively password protect access to projection-device-status user interface 132 based on administrator input. In some cases, access by a basic user may be limited only to projection controls. Moreover, administrative input may dictate which menus of the projection controls are displayed to the basic user. Furthermore, security module 122 may be configured to set/change a password or personal identification number (PIN) according to administrator input. Examples of operation-specific views of projection-device-status user interface 132 corresponding to login security for remote control of projection device 102 with which security module 122 may interact will be discussed in further detail below with reference to FIGS. 14-17.

It will be appreciated that in some embodiments the above described modules each may be configured to generate one or more different operation-specific views of projection-device-status user interface 132. In some cases, the above described modules may be embodied as a set of instructions stored in data storage 110 and executable by processing subsystem 106 (or a processing unit of sever subsystem 108). Data storage 110 may be virtually any suitable storage device, such as flash memory, hard drive, random access memory (RAM), etc. In some embodiments, server subsystem 102 may be an application program stored on data storage 110 and executable by processing subsystem 106. In some embodiments, server subsystem 108 may include a processing unit that is designated specifically for operations related to network communication, and more particularly, remote control of projection device 102 by remote client 128. Further, it will be appreciated that server subsystem 108 may be implemented as software, hardware, firmware, or a combination thereof.

Figure 2A:
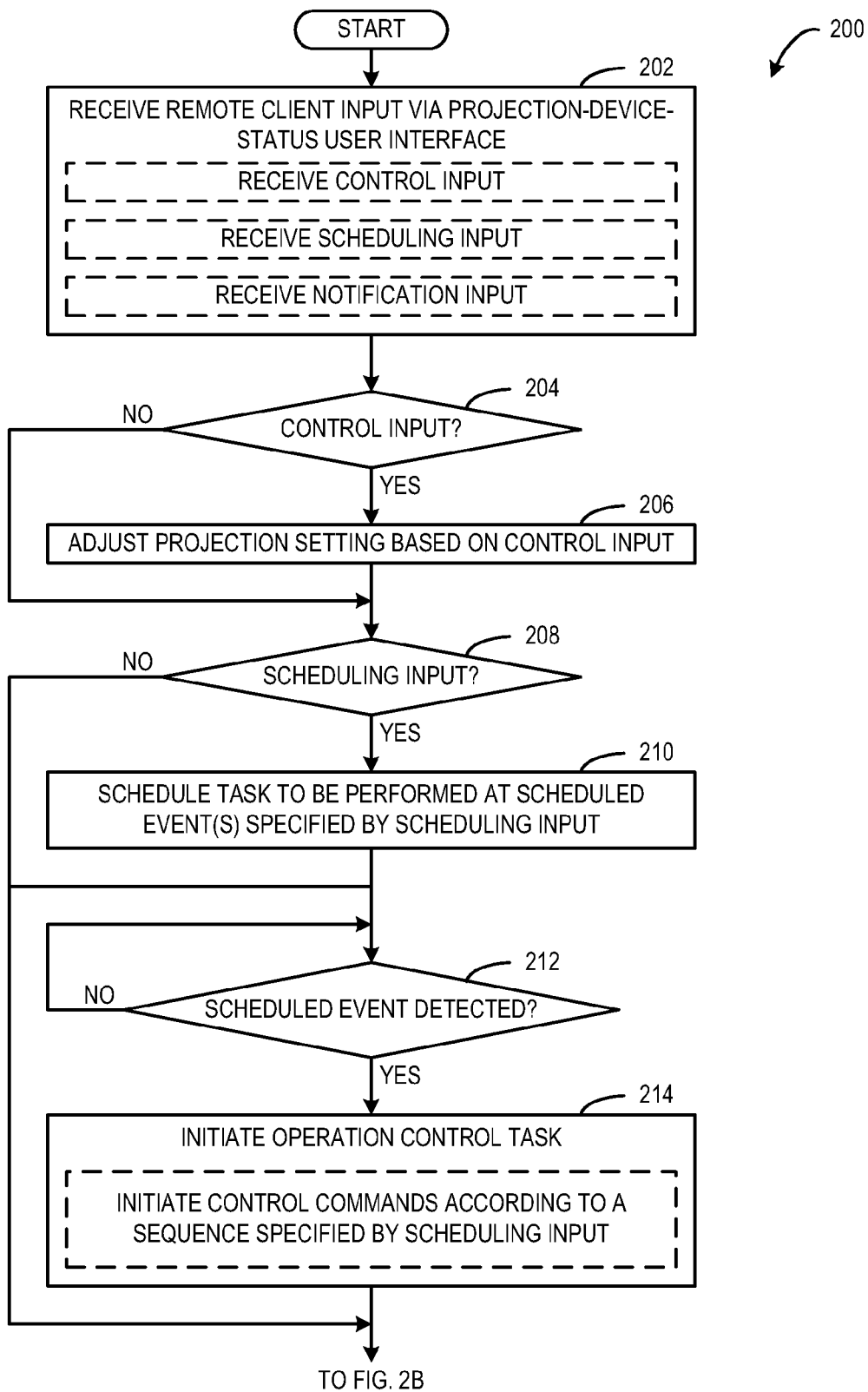
FIGS. 2A-2B show a flow diagram of an exemplary method for remote control of a projection device utilizing remote client input received via a projection-device-status user interface served to the remote client by the projection device.
Figure 2B:
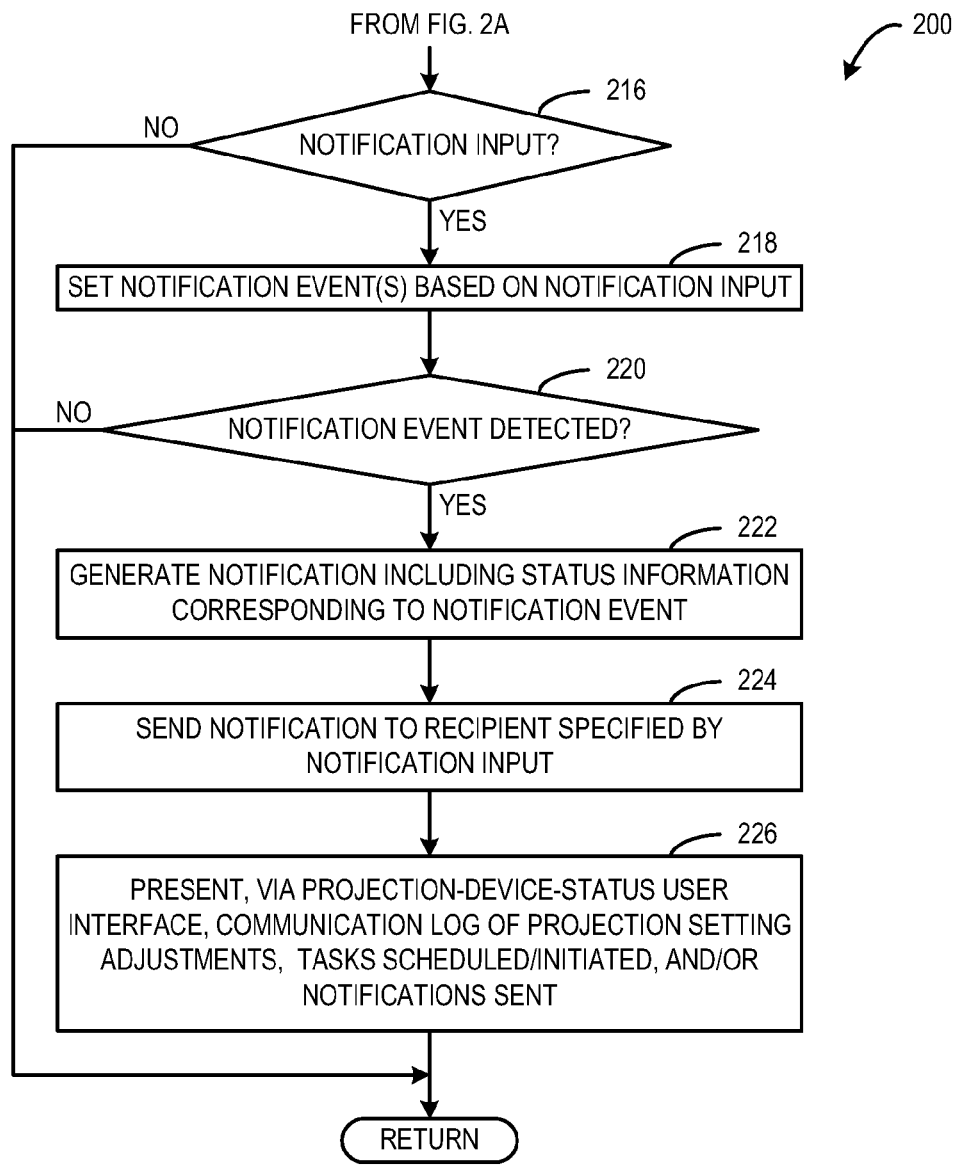

FIGS. 2A-2B show a flow diagram of an example method 200 for enabling remote control of a projection device utilizing remote client input received via a projection-device-status user interface served to the remote client by the projection device. Further, the method may provide projection device status information as feedback based on remote control to a remote client or other recipient. As an example, the method may be performed at projection device 102 including server subsystem 108 which may be configured to generate projection-device-status user interface 132 presentable to remote client 128 via webpage 130 served by server subsystem 108. The method begins at 202, where the method may include receiving remote client input via the projection-device-status user interface.

In some cases, the remote client input may include control input that may be received via an operation-specific view of the projection-device-status user interface corresponding to projection control. Control input may be utilized to adjust projection settings that may be categorized according to basic projection device operation, basic picture control, advanced picture control and projection device setup. For example, a control input may include an adjustment to a state of a projection setting, activation/deactivation of a projection setting, and/or a parameter value of a projection setting In some cases, the client input may include scheduling input that may be received via an operation-specific view of the projection-device-status user interface corresponding to scheduling of projection device operation control tasks. The scheduling input may be used to perform a specified operation control task by the projection device based on a particular event specified by the scheduling input. Scheduling input may include a frequency and a time at which a projection device operation control task is to be initiated. Further, in some cases, an operation control task may include a plurality of control commands to be performed in order to complete the task. As such, scheduling input may include a command sequence according to which the control commands are performed by the projection device. It will be appreciated that a scheduled task may be performed automatically at a future event defined by scheduling input whereas control input may effect a more immediate change in operation of the projection device.

In some cases, the remote client input may include notification input that may be received via an operation-specific view of the projection-device-status user interface corresponding to notifications that may be sent to recipients responsive to certain events associated with operation of projection device. The notification input may be utilized to send a notification having projection device status information to a recipient. In particular, notification input may include selections (or activation) of different notification events that cause a notification to be generated. The notification events may be classified according to different types of notifications. In some cases, a selection of notification events may include selection of every notification event of a particular notification type. The ability to select different notification events may allow projection device status monitoring to be customized as desired by users/administrators of the projection device.

Furthermore, notification input may include designations of recipients to receive notifications generated by the projection device. In a particular example, the notification input includes an electronic mail address of a recipient to which a notification may be sent. Further, different types of notifications may be selected to be sent to different recipients. For example, one recipient may receive reminder-type notifications and another recipient may receive warning-type and/or error-type notifications. In the case of reminder notifications, notification input may include a reminder duration that sets a duration that may elapse before a reminder notification is sent to a recipient, or input may include a date that sets a date on which to send a reminder notification to the recipient.

It will be appreciated that the received remote client input may correspond to any one of the aspects of projection device control associated with the operation-specific views of the projection-device-status user interface.

Next at 204, the method may include determining if the received remote client input is control input. If the received remote client input is control input, the method moves to 206. Otherwise, the received remote client input is not control input and the method moves to 208.

At 206, the method may include adjusting a projection setting of the projection device based on the control input received from the remote client via the projection-device-status user interface. As an example, the control input may include a specified contrast level, and upon receiving the control input the contrast level of the projection device may be adjusted to the specified contrast level. As another example, the control input may include a command to turn the projection device off, and upon receiving the control input command the projection device may turn off.

At 208, the method may include determining if the received remote client input is scheduling input. If the received remote client input is scheduling input the method moves to 210. Otherwise, the received remote client input is not scheduling input and the method moves to 216.

At 210, the method may include scheduling a projection device operation control task to be performed at an event specified by the scheduling input. In one example, the operation control task to be performed is to turn the projection device off and the task is scheduled to be performed at an event specified to occur at 5:00 PM. Upon scheduling the operation control task, the method may move to 212 as well as branch to 216.

At 212, the method may include detecting if the scheduled event has occurred. If the scheduled event has occurred the method moves to 214. Otherwise the scheduled event has not occurred and the method loops back to 214 and polls for detection of the scheduled event.

At 214, the method may include initiating the projection device operation control task scheduled based on the scheduling input. Continuing with the above described example, upon reaching 5:00 PM (i.e., the scheduled event) the projection device is turned off. In a case where the task includes a plurality of control commands, the method may include initiating the control commands according to the sequence specified by the scheduling input. As an example, a scheduled task may be to initialize a projection device for use each morning at 9:00 AM. Initializing the projection device may include a sequence of control commands that starts with turning on the projection device and as a second control command setting the video source of the projection device. The scheduling input may include a sequence that specifies that the projection device is to be turned on prior to the video source being set. The sequence provided in the scheduling input may facilitate proper performance of the task that otherwise could be performed improperly if the commands were performed according to a different order.

At 216, the method may include determining if the received remote client input is notification input. If the received remote client input is notification input, the method moves to 218. Otherwise, the received remote client input is not notification input and the method ends or returns.

At 218, the method may include setting (or activating) a notification event to be monitored based on the notification input. The notification event may be an event that triggers a notification to be generated. For example, a reminder-type notification may be set to monitor the life of a projection lamp based on a duration specified by notification input, such as 20 lamp hours prior to the expected lamp lifetime.

At 220, the method may include detecting if the notification event has occurred. If the notification event has occurred, the method moves to 222. Otherwise, the notification event has not occurred and the method loops back to 220 and polls for detection of the notification event.

At 222, the method may include generating a notification including projection device status information corresponding to the notification event. Continuing with the above described example, upon reaching the 20 lamp hours mark prior to the expected lifetime of the lamp, a reminder-type notification may be generated to indicate that the life of the projection lamp is nearly over and to replace the projection lamp.

At 224, the method may include sending the notification to the recipient specified by the notification input. In one example, the notification is sent to the recipient via electronic mail.

At 226, the method may include presenting, via the projection-device-status user interface, a communication log of projection setting adjustments made based on control input, projection device operation control tasks that have been scheduled and/or initiated based on scheduling input, and notifications sent based on notification input. The communication log may permit a user/administrator to view operation-and-control activity of the projection device remotely so that monitoring and maintenance of the projection device may be performed in a convenient manner.

The above described method may be performed to allow for a projector to be remotely controlled via a projection-device-status user interface of a webpage. In particular, the method may permit more immediate remote control operation of a projection device as well as scheduled remote control operation to be performed automatically in the future. Moreover, the method may facilitate projection device status information to be sent to remote recipients based on changes in projection device operation and other monitored events. It will be appreciated that in some embodiments a server subsystem of the projection device including one or more of the above described modules may perform the method.

Figure 3:
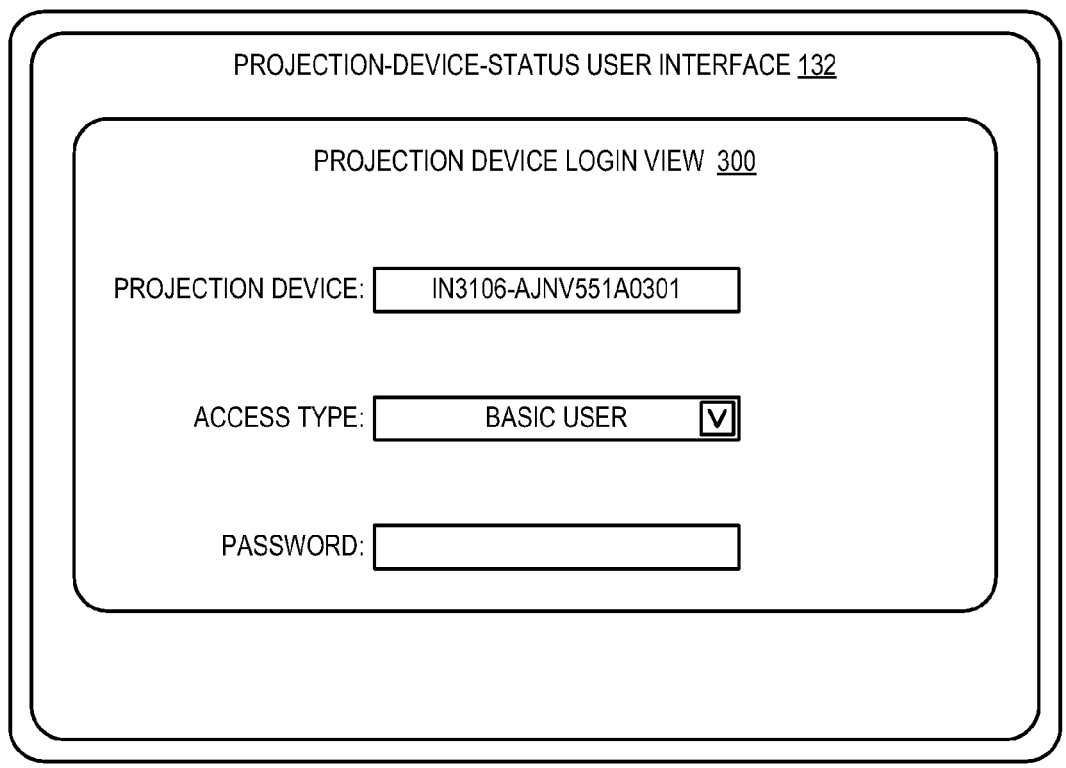
FIG. 3 shows an example projection a projection device login view of a projection-device-status user interface that may be served to a remote client to remotely control a projection device.

FIG. 3 shows a projection device login view 300 of projection-device-status user interface 132 in which remote client input may be entered to gain remote access to a specified projection device to view operation information and to remotely control the specified projection device. Projection device login view 300 may include a projection device identification field 302 which may be populated with remote client input to specify a projection device to be accessed remotely. In some embodiments, the projection device identification field may be replaced with a dropdown menu having a list of selectable projection devices. In other embodiments, the projection device may be implicitly identified external to the user interface (for example, the user interface may be available through a web address unique to an individual projection device) and therefore the device identification field may be non-modifiable and serve only to confirm the identity of the device being accessed remotely.

Projection device login view 300 may include an access type field 304 in which a type of user may be specified, such as basic user or administrator types, for example. Different user types may have different projection-device-status user interface access and projection device remote control capabilities.

Projection device login view 300 may include a password field 306 which may be populated with remote client input of a suitable password to gain access to the operation-specific views of projection-device-status user interface 132. In some cases, a password may not be needed to gain access to the operation-specific views of projection-device-status user interface 132 based on settings of security settings tabs shown FIGS. 14-17 and discussed in further detail below.

FIGS. 4-17 show examples of operation-specific views of projection-device-status user interface 132 of FIG. 1. The operation-specific views of projection-device-status user interface 132 may allow for remote client input to control different aspects of operation of the projection device as well as present information relating to the different aspects of operation. Projection-device-status user interface 132 may include a projection-device-information panel 402 that includes information corresponding to the projection device currently under remote control via the projection-device-status user interface 132. In particular, projection-device-information panel 402 may include the name of the projection device, the model number of the projection device, and the serial number of the projection device. The presented information may facilitate easy recognition of the particular projection device in the case that maintenance is to be performed on the projection device. Projection-device-status user interface 132 may include a control panel 404 having links to different operation-specific views which may be selected for presentation. A currently displayed operation-specific view may be indicated by a bold type link in control panel 404.

Figure 4:
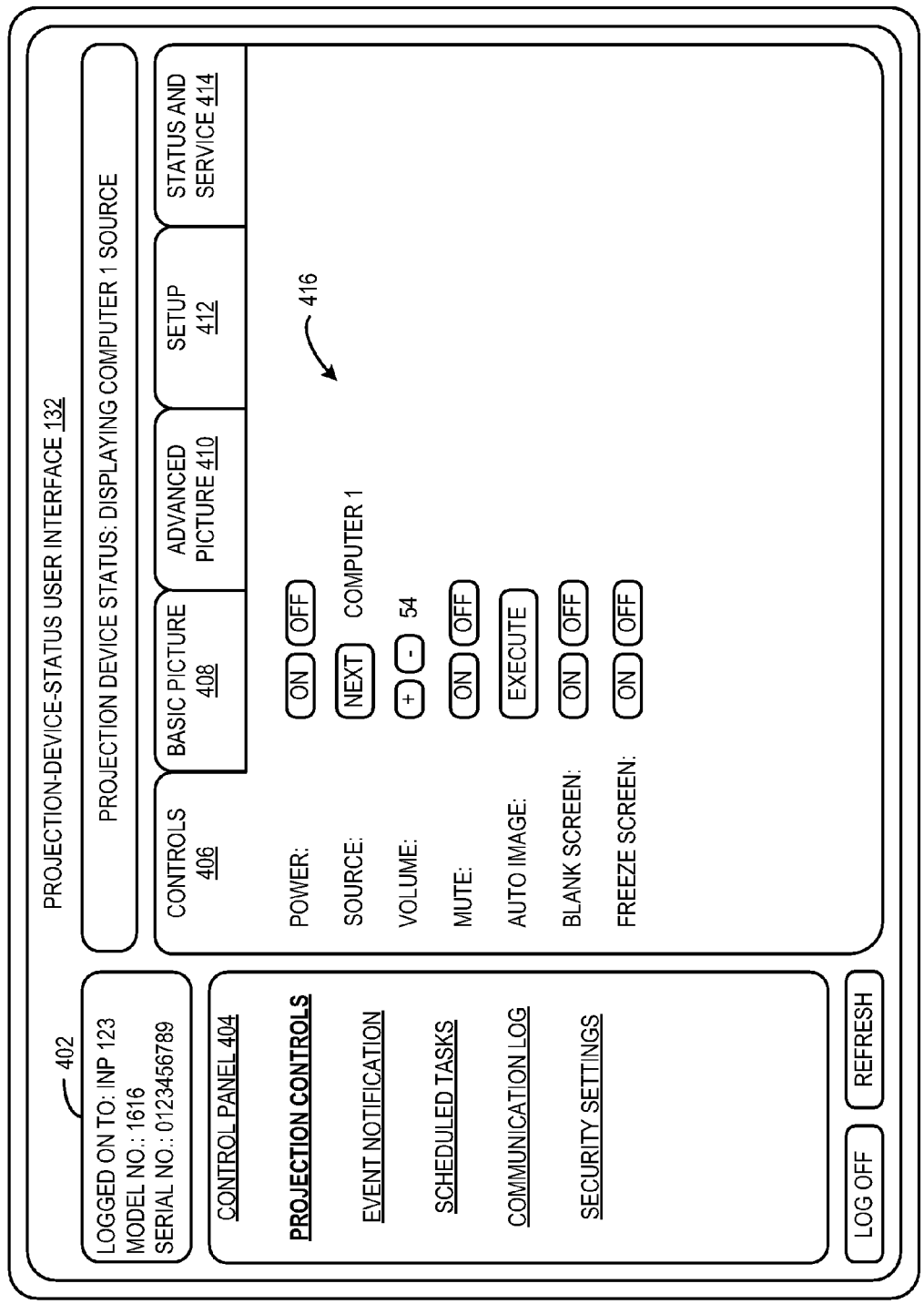
FIG. 4 shows an example projection controls view of a projection-device-status user interface that may be served to a remote client to remotely control the basic functions of a projection device.

FIGS. 4-8 show operation-specific views of projection-device-status user interface 132 corresponding to operation and status of projection settings and controls. In particular, projection settings and controls views may include a projection controls tab 406, a basic picture tab 408, an advanced picture tab 410, a setup tab 412, and a status and service tab 414. FIG. 4 shows a view of projection controls tab 406 of projection-device-status user interface 132 in which remote client input may be entered to remotely control general operation of the projection device. Projection controls tab 406 includes a plurality of operation selectors 416. Each of operation selectors may be selectable by remote client input to adjust a particular operating setting or state of the projection device. Examples of operation setting adjustable by operation selectors 416 may include projection device power on/off, video source, volume +/−, mute on/off, auto image execute, blank screen on/off, and freeze screen on/off. It will be appreciated that operation selectors 416 may by embodied by forms other than buttons. For example, projection settings may be adjusted by remote client input received via drop down menus, text fields, dials, sliding scales, etc.

Figure 5:
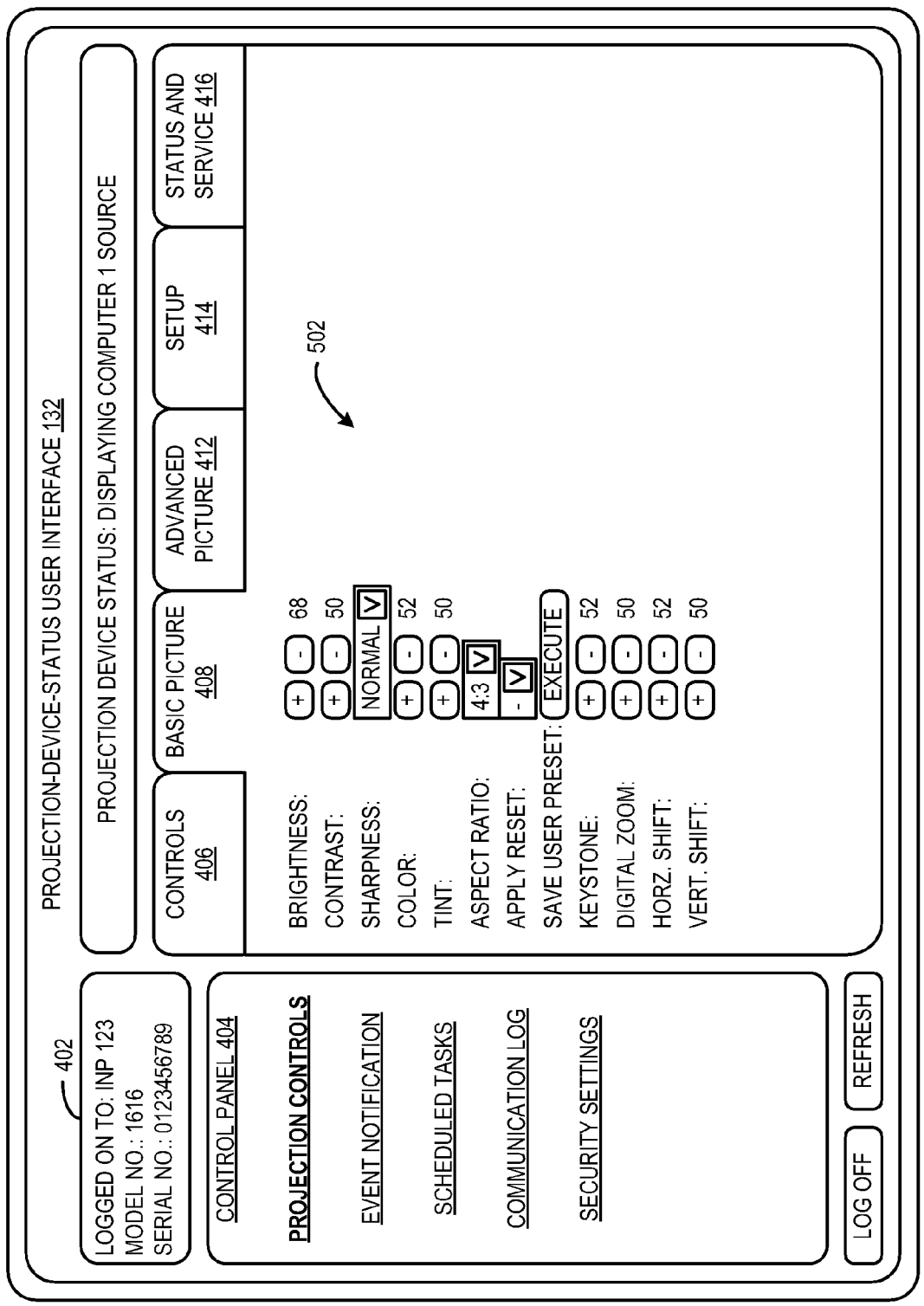
FIG. 5 shows an example projection basic picture view of a projection-device-status user interface that may be served to a remote client to remotely control basic picture adjustments of a projection device.

FIG. 5 shows a view of basic picture tab 408 of projection-device-status user interface 132 in which remote client input may be entered to remotely control commonly used or basic picture settings of an image projected by the projection device. Basic picture tab 408 includes a plurality of basic picture selectors 502. Each of basic picture selectors 502 may be selectable by remote client input to adjust a particular basic picture setting of an image projected by the projection device. Example projection settings that may be adjusted by remote client input via basic picture selectors 502 may include BRIGHTNESS +/−, CONTRAST +/−, SHARPNESS, COLOR +/−, TINT +/−, ASPECT RATIO, PICTURE RESET, SAVE USER PRESET, KEYSTONE +/−, DIGITAL ZOOM +/−, HORIZONTAL SHIFT +/−, AND VERTICAL SHIFT +/−. It will be appreciated that basic picture selectors 502 may by embodied by forms other than buttons. For example, basic picture settings may be adjusted by remote client input received via drop down menus, text fields, virtual dials, sliding scales, etc.

Figure 6:
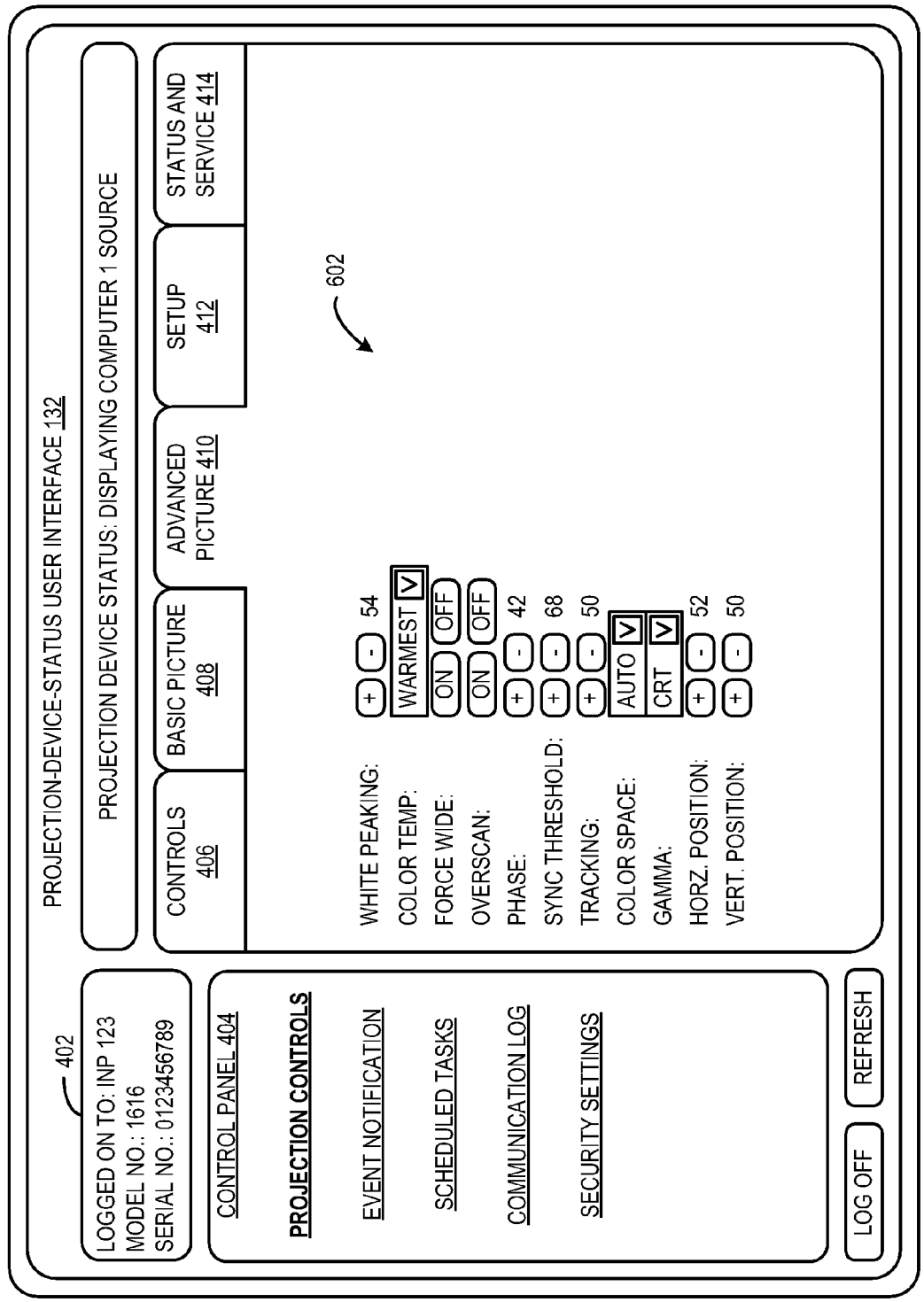
FIG. 6 shows an example projection advanced picture view of a projection-device-status user interface that may be served to a remote client to remotely control advanced picture adjustments of a projection device.

FIG. 6 shows a view of an advanced picture tab 410 of projection-device-status user interface 132 in which remote client input may be entered to remotely control seldom used or advanced picture settings of an image projected by the projection device. Advanced picture tab 420 includes a plurality of advanced picture selectors 602. Each of advanced picture selectors 602 may be selectable by remote client input to adjust a particular advanced picture setting of an image projected by the projection device. Example projection settings that may be adjusted by remote client input via advanced picture selectors 602 may include, WHITE PEAKING +/−, ON/OFF, COLOR TEMP, FORCE WIDE ON/OFF, OVERSCAN ON/OF, PHASE +/−, SYNC THRESHOLD +/−, TRACKING +/−, COLOR SPACE, GAMMA, HORIZONTAL POSITION +/−, AND VERTICAL POSITION +/−. It will be appreciated that advanced picture selectors 602 may by embodied by forms other than buttons. For example, advanced picture settings may be adjusted by remote client input received via drop down menus, text fields, virtual dials, sliding scales, etc.

Figure 7:
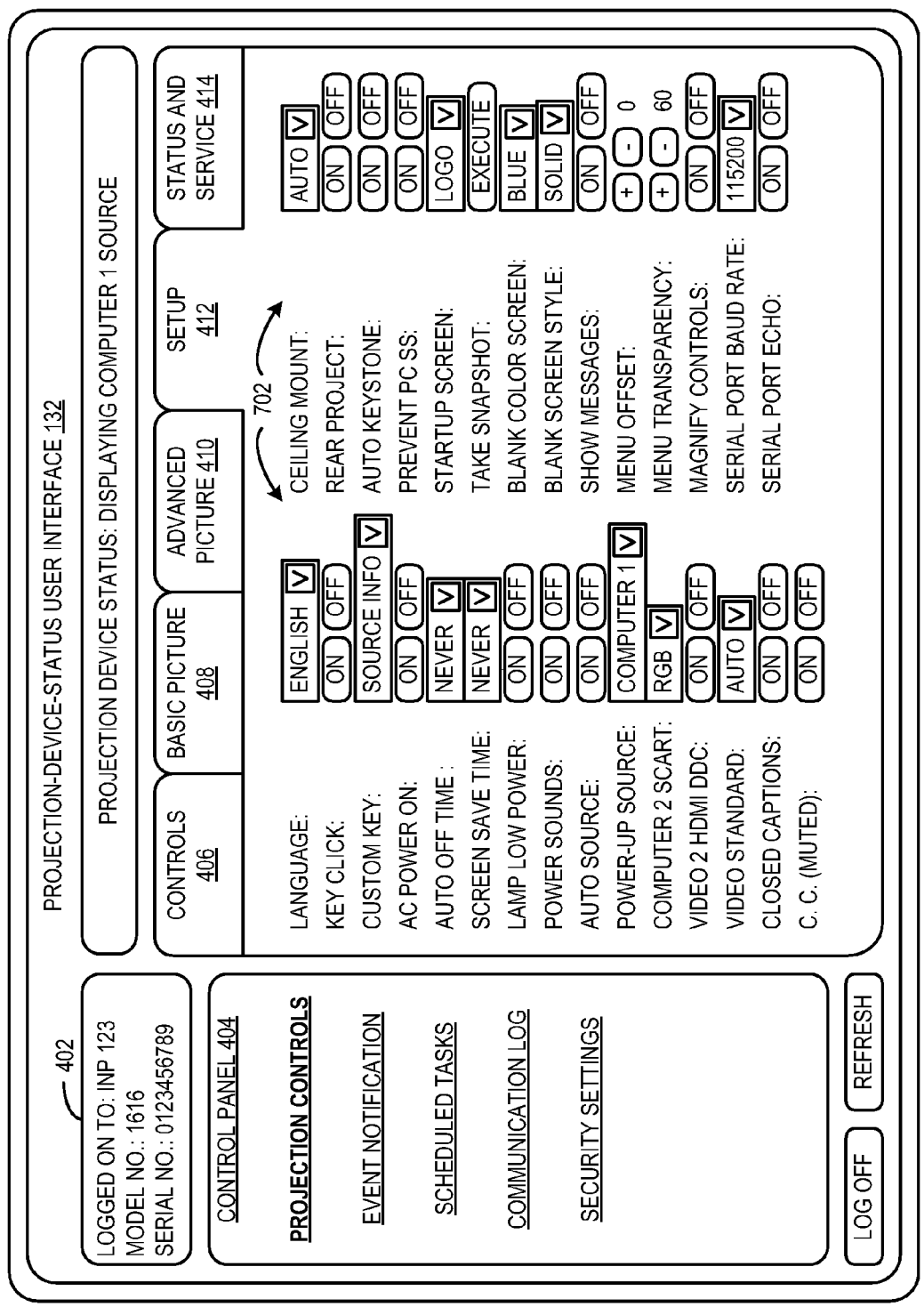
FIG. 7 shows an example projection setup view of a projection-device-status user interface that may be served to a remote client to remotely control setup-related adjustments of a projection device.

FIG. 7 shows a view of a setup tab 412 of projection-device-status user interface 132 in which remote client input may be entered to remotely control setup of the projection device. It will be appreciated that a projection setting may be adjusted based on control of setup of the projection device. Setup tab 412 includes a plurality of projection device setup selectors 702. Each of projection device setup selectors 702 may be selectable by remote client input to adjust a particular projection device setup (or projection) setting of the projection device. Example projection device setup settings that may be adjusted by remote client input via projection device setup selectors 702 may include LANGUAGE, KEY CLICK ON/OFF, CUSTOM KEY, AC POWER ON ON/OFF, AUTO OFF TIME, SCREEN SAVER TIME, LAMP LOW POWER ON/OFF, POWER SOUNDS ON/OFF, AUTO SOURCE ON/OFF, POWER-UP SOURCE, COMPUTER 2 SCART, VIDEO 2 HDMI DDC ON/OFF, VIDEO STANDARD, CLOSED CAPTIONS ON/OFF, CLOSED CAPTION (MUTED) ON/OFF, CEILING MOUNT, REAR PROJECT ON/OFF, AUTO KEYSTONE ON/OFF, PREVENT PC SCREEN SAVER ON/OFF, STARTUP SCREEN, TAKE SNAPSHOT, BLANK COLOR SCREEN, BLANK SCREEN STYLE, SHOW MESSAGES ON/OFF, MENU OFFSET +/−, MENU TRANSPARENCY +/−, MAGNIFY CONTROLS ON/OFF, SERIAL PORT BAUD RATE, SERIAL PORT ECHO ON/OFF. It will be appreciated that projection device setup selectors 702 may by embodied by forms other than buttons. For example, setup may be adjusted by remote client input received via drop down menus, text fields, virtual dials, sliding scales, etc.

Figure 8:
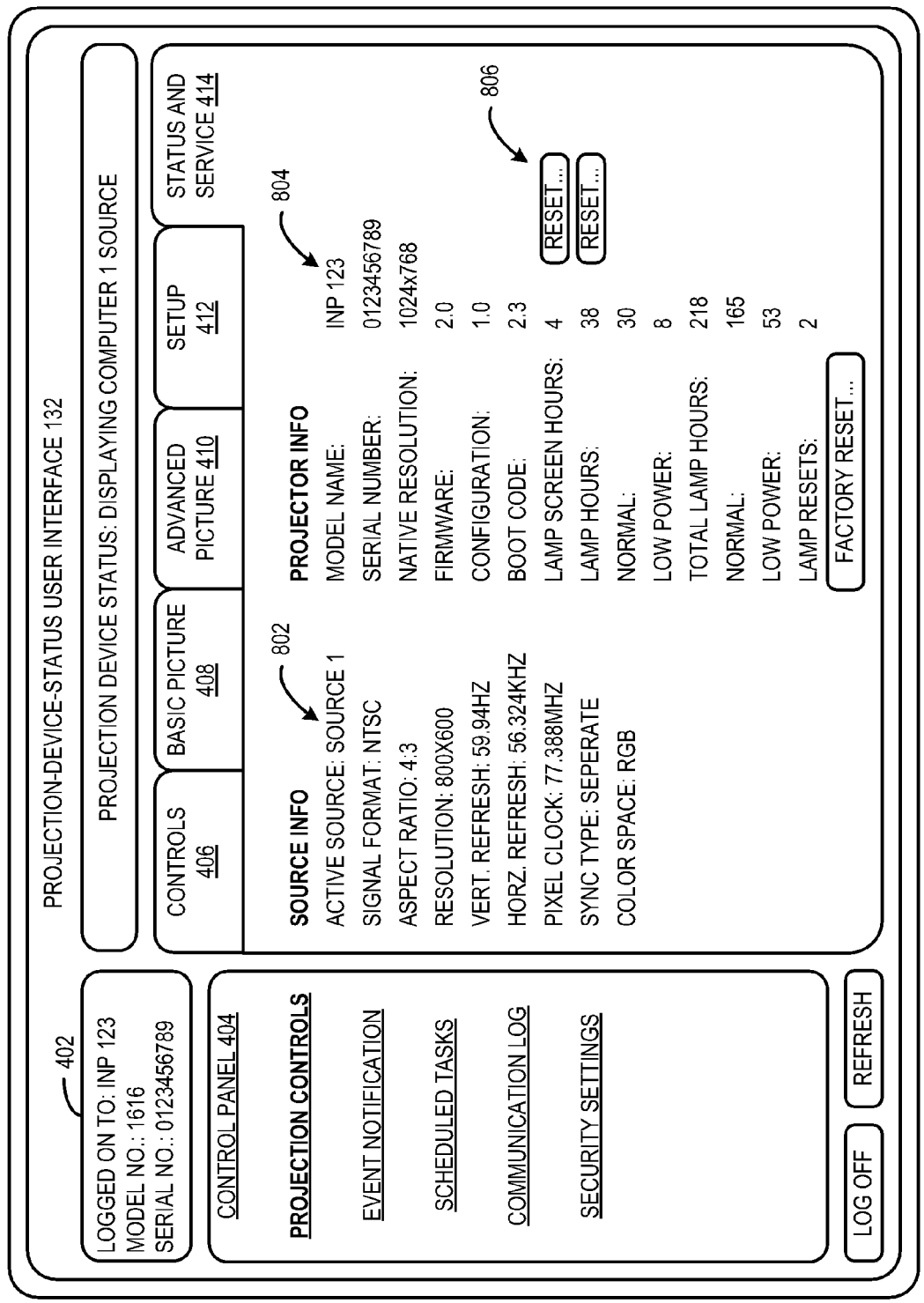
FIG. 8 shows an example projection status and service view of a projection-device-status user interface that may be served to a remote client to remotely view the status of a projection device.

FIG. 8 shows a view of a status and service tab 414 of projection-device-status user interface 132 that may present status information of the projection device to the remote client. In particular, service tab 414 may include source information 802 of a video source currently providing source content to the projection device for projection and projection device (or projector) information 804. Examples of source information 802 that may be presented on service tab 414 may include the name of the active source, the signal format of the active source, the aspect ratio of the source content, the resolution of the source content, the vertical refresh rate of the active source, the horizontal refresh rate of the active source, the pixel clock, the synchronization type, and the color space of the active source. Examples of projection device information 804 that may be presented on service tab 414 may include the model name of the projection device, the serial number of the projection device, the native resolution of the projection device, the firmware version installed on the projection device, the configuration version, the boot code version, the amount of lamp screen hours of the current lamp, the amount of lamp hours of the current lamp, the amount of normal hours of the current lamp, the amount of low power hours of the current lamp, the total amount of lamp hours of all lamps, the amount of normal hours of all lamps, the amount of low power hours of all lamps, and the number of lamp hour resets based on replacement of a lamp. Further, status and service tab 414 may include lamp reset selectors 806 that may be configured to be selected via remote client input to reset a lamp screen hours counter and a lamp hour counter.

Figure 9:
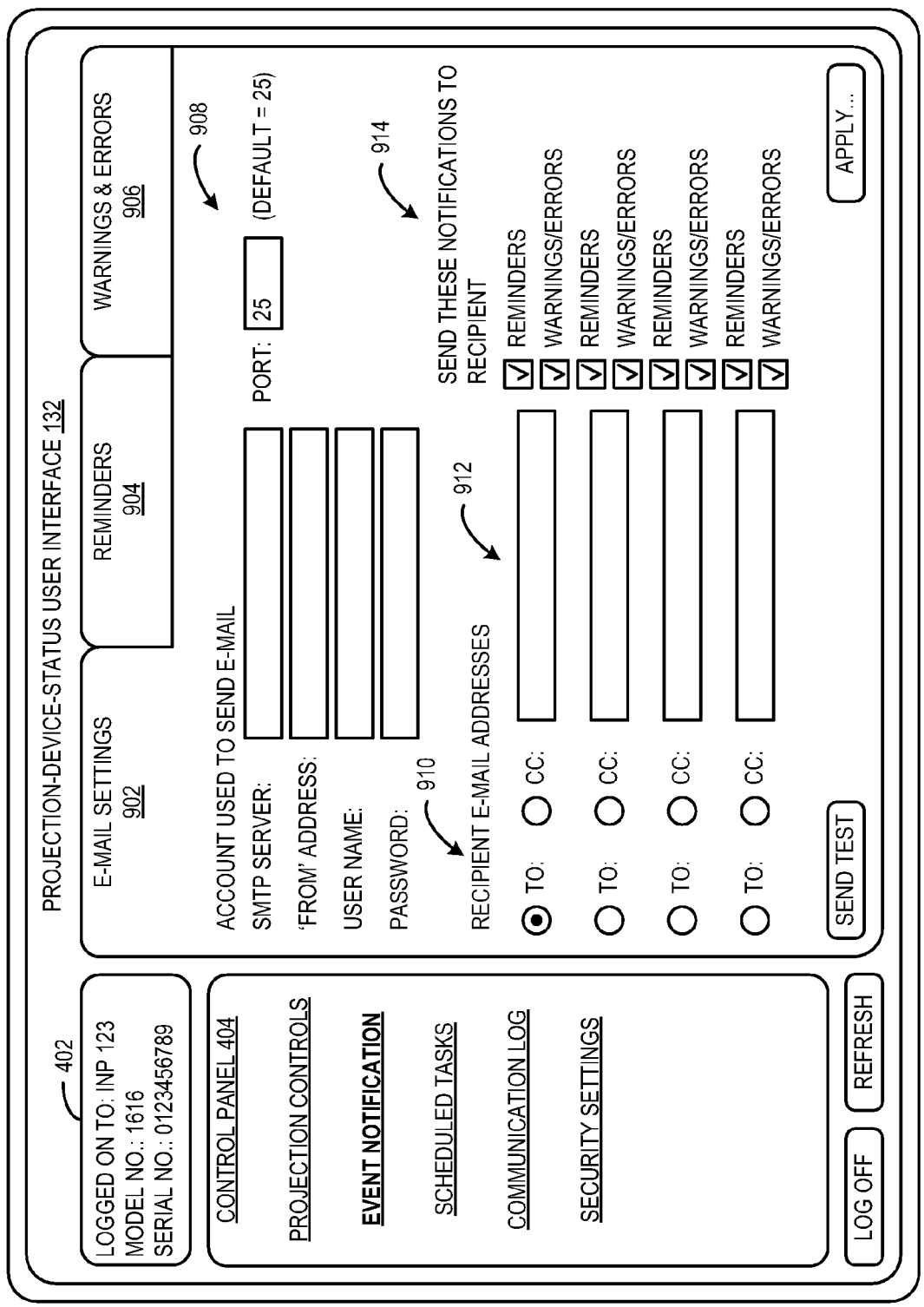
FIG. 9 shows an example event notification electronic mail settings view of a projection-device-status user interface that may be served to a remote client to remotely control a projection device.
Figure 11:
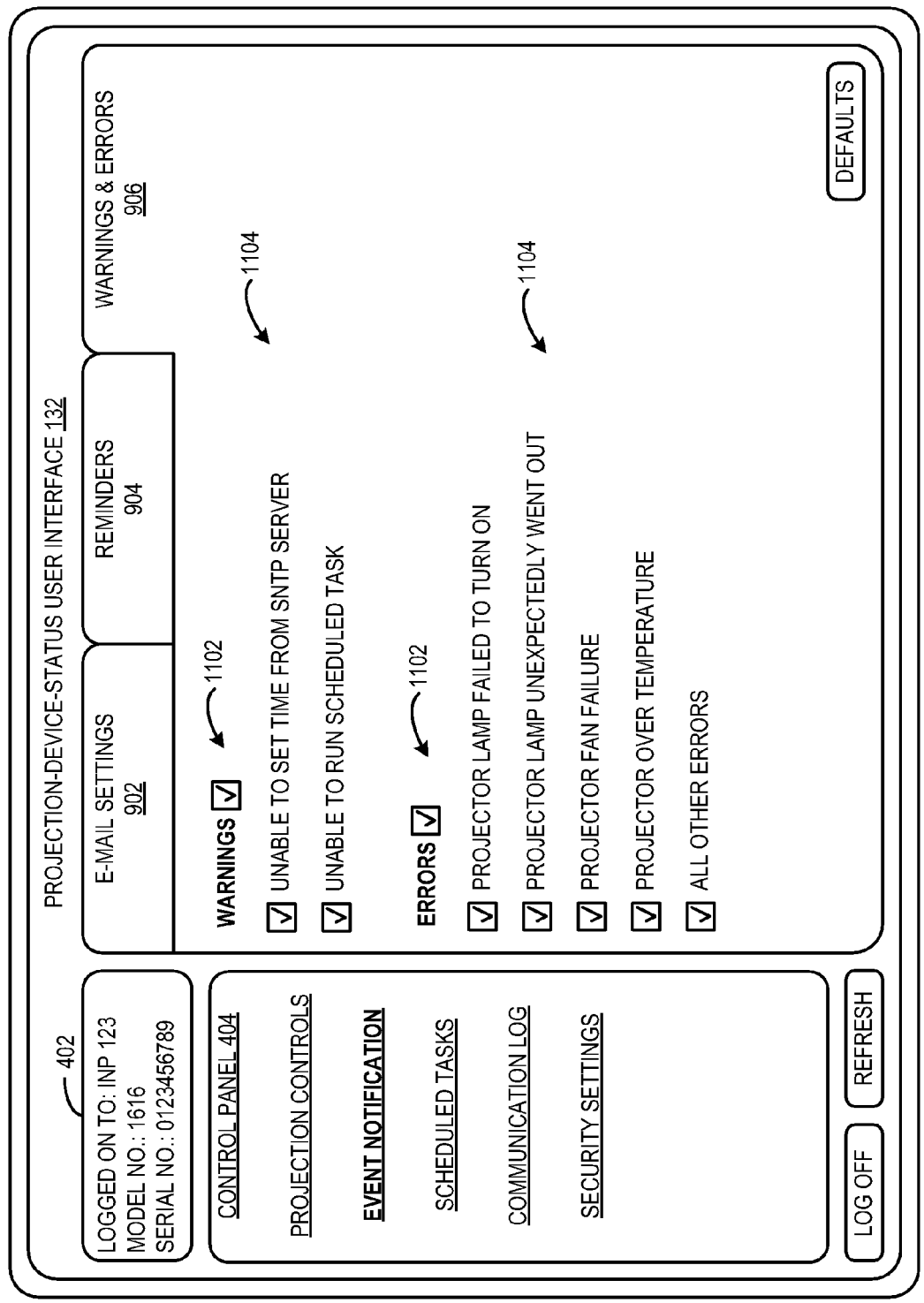
FIG. 11 shows an example event notification warnings and errors view of a projection-device-status user interface that may be served to a remote client to remotely control a projection device.

FIGS. 9-11 show operation-specific views of projection-device-status user interface 132 corresponding to projection device event notifications. In particular, the projection device event notification views may include an e-mail settings tab 902, a reminders tab 904, and a warnings and errors tab 906.

FIG. 9 shows a view of e-mail settings tab 902 of projection-device-status user interface 132 that includes features that allow for remote client input to designate a sender as well as recipients of notifications of projection device events. E-mail settings tab 902 may include sender e-mail account fields 908 in which remote client input may designate an e-mail server, a port, an email address, a username, and a password of an e-mail account from which notifications may be sent. E-mail settings tab 902 may include recipient selectors 910 which may be selected via remote client input to activate a recipient to receive projection device event notifications. Further, recipient selectors 910 may designate whether a notification is sent directly to a recipient or whether a recipient is a secondary recipient that receives a carbon copy of the notification. E-mail settings tab 902 may include recipient e-mail address fields 912 that may be filled out with remote client input to indicate an e-mail address of recipient (s) to be sent a projection device event notification. Notification preference selectors 914 that correspond to each of e-mail address fields 912 may be selected to identify which types of notification(s) are to be sent to the corresponding e-mail address of a recipient. In the illustrated embodiment, reminder-type notifications and/or warning/error-type notifications may be selected to be sent to a recipient.

FIG. 10 shows a view of reminders tab 904 of projection-device-status user interface 132 that includes reminder-type events that may be selected via remote client input to generate reminder-type notifications to be sent to one or more recipients designated in email settings tab 902. Further, reminders tab 904 may include a schedule created via remote client input for which the reminder-type events take place. Reminder-type selectors 1002 may be selected via remote client input to generate a reminder-type notification. In the illustrated embodiment, reminder-type selectors include a projector general status reminder, a clean lamp screen reminder, replace lamp screen reminder, a lamp life time exceeded reminder, and a warranty expired reminder. Schedule fields 1004 may correspond to each of reminder-type selectors 1002 and may be filled in via remote client input to schedule when the reminder event is to occur. A frequency of occurrence may be entered into the general projection status reminder and the clean lamp reminder schedule fields, such as for example, every 48 hours or every 4 weeks. A lifetime threshold of a projection lamp may be entered into the replace lamp reminder schedule field, such as for example, projection lamp lifetime is less than 20 hours. A date may be entered into the warranty expired reminder schedule field, such as for example, Jan. 1, 2008.

FIG. 11 shows a view of warnings and errors tab 906 of projection-device-status user interface 132 that includes warning-type events and error-type events that may be selected via remote client input to generate a notification to be sent to one or more recipients designated in e-mail settings tab 902. Notification type selectors 1102 may be selected via remote client input to select every event of that particular notification type. For example, selection of the warning-type notification selector may generate a notification upon occurrence of every warning event presented in warnings and errors tab 906. As another example, selection of the error-type notification selector may generate a notification upon occurrence of every error event presented in warnings and errors tab 906.

Furthermore, notification instance selectors 1104 may be selected via remote client input to select a particular event of a notification type that triggers a notification to be generated. Notification instance selectors 1104 may include instances of warnings and errors. Example warning-type instance selectors may include an unable to set time from SNTP server warning and an unable to run scheduled task warning. Example error-type instance selectors may include a projector lamp failure to turn on error, a projector lamp unexpectedly went out error, a projector fan failure error, a projector over temperature error, and a miscellaneous error.

Figure 12:
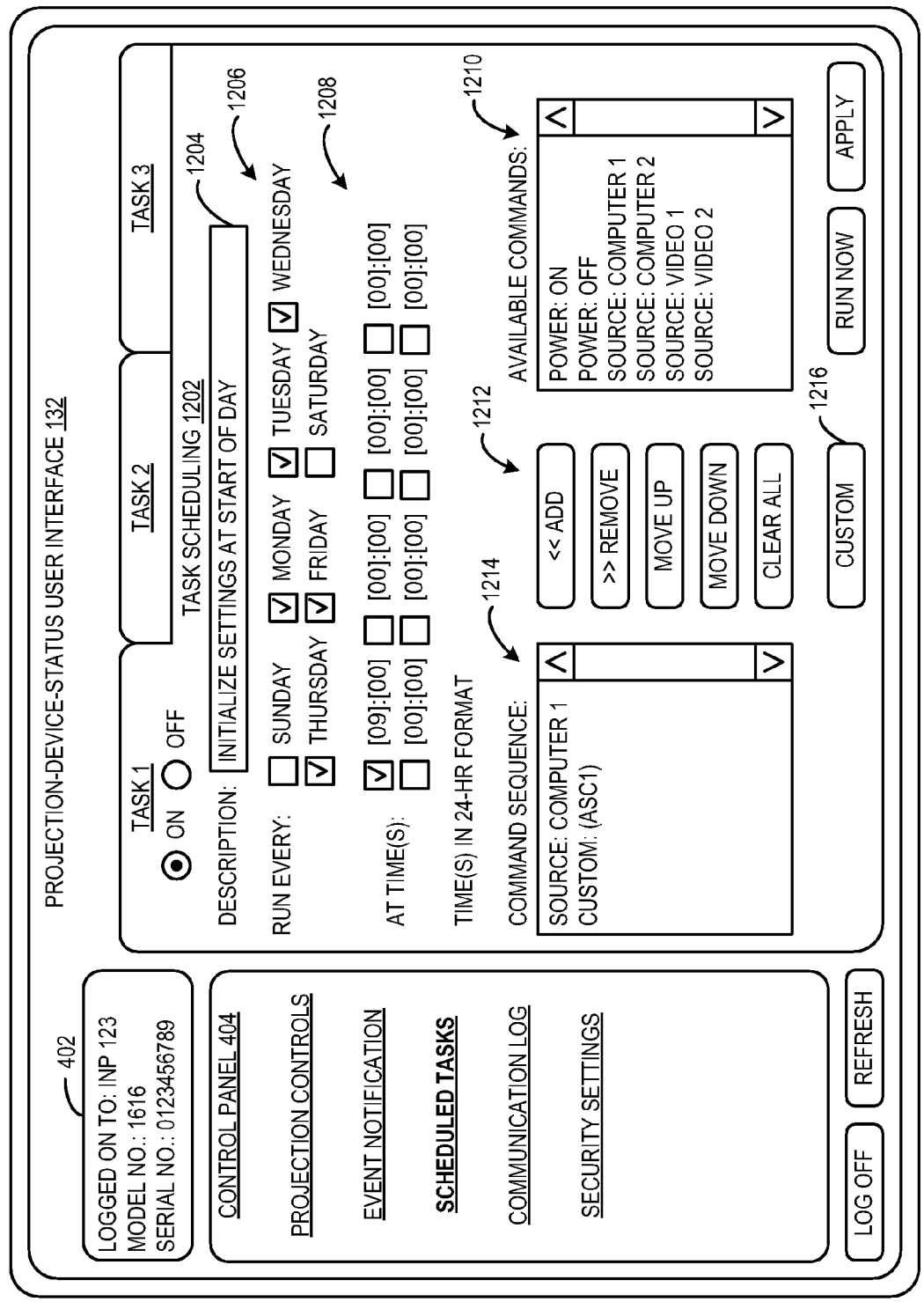
FIG. 12 shows an example task scheduling view of a projection-device-status user interface that may be served to a remote client to remotely control a projection device.

FIG. 12 shows a task scheduling view 1202 of projection-device-status user interface 132. Task scheduling view 1202 may include a plurality of customizable tasks that may be performed at a time designated by remote client input. Each customizable task may include a description field 1204 to describe the operation to be performed, such as projection device initiation or projection device shutdown, for example. Each customizable task may include day-of-the-week selectors 1206 one or more of which may be selected to schedule a day of the week at which the projection device operation control task is to be performed by the projection device. For each of day-of-the-week selectors 1206, one or more time-of-day selectors 1208 may be selected to schedule a time of day at which the projection device operation control task is to be performed by the projection device. In one particular example, the time-of-day selectors are listed in 24-hour time format. It will be appreciated that a task may be scheduled to be performed a single time or multiple times per day and/or multiple days of the week.

Control commands 1210 may include a list of control commands, each of which are selectable to be performed as part of a projection device operation control task. Example control commands include projection device power: on, projection device power: off, as well as a variety of sources to which the projection device may be switched to receive video input for projection. Control selectors 1212 may be used to manipulate control commands 1210 to create a control sequence 1214. The control sequence 1214 may be an ordered list of control commands that are performed to complete an operation control task. Examples of control selectors 1212 include an add selector, a remove selector, a move up selector, a move down selector, and a clear all selector. In some embodiments, drag and drop functionality may be implemented to manipulate command sequencing instead of, or in addition to, using the above described selectors.

Furthermore, task scheduling view 1200 may include a custom selector 1216 that displays a field that may be populated with custom commands that may be added to the command sequence via remote client input. It will be appreciated that commands generated utilizing custom selector 1216 may be available to change any suitable projection device setting associated with the projector control views (See FIGS. 4-8), not just those listed as available control commands 1210.

Figure 13:
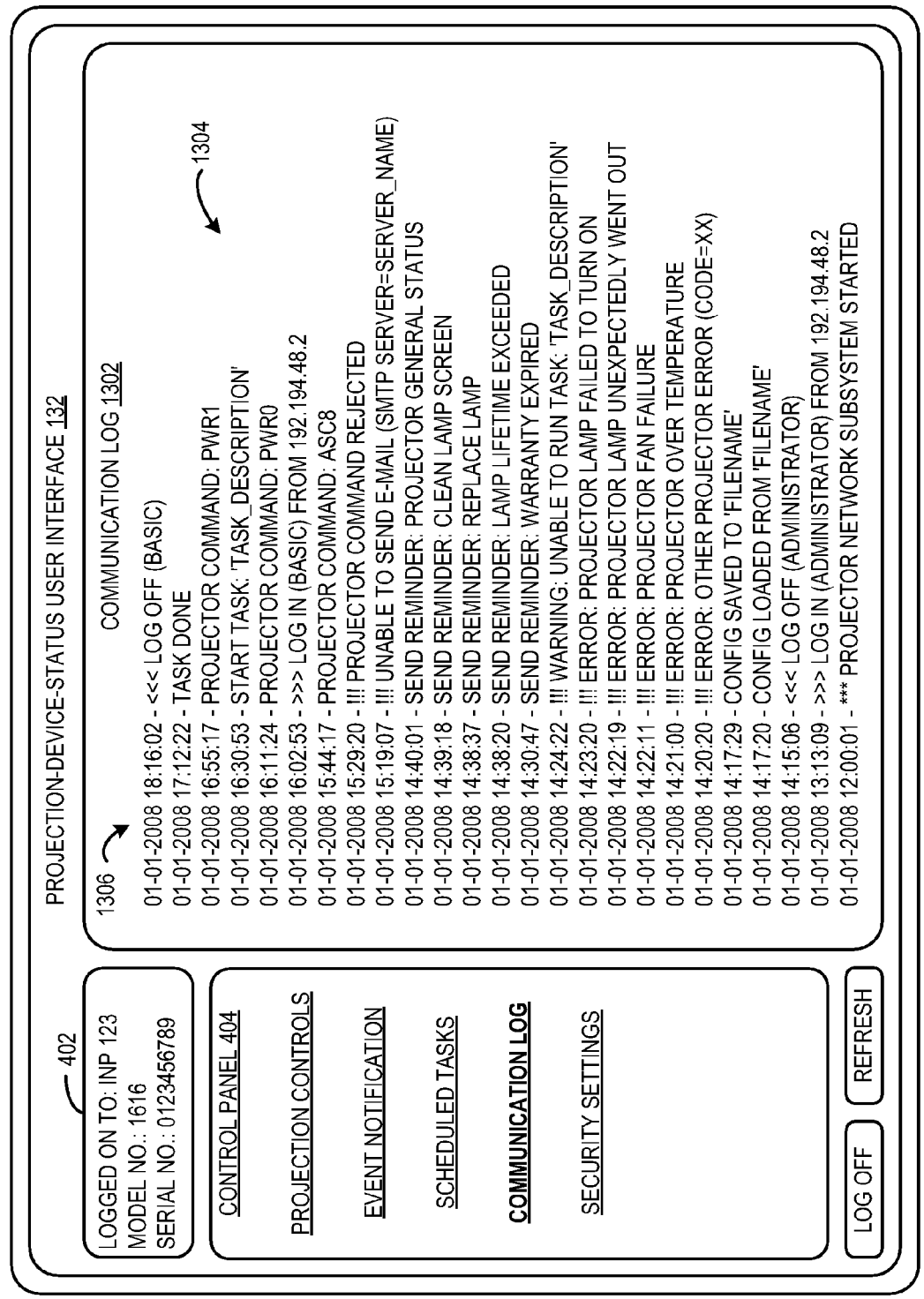
FIG. 13 shows an example communication log view of a projection-device-status user interface that may be served to a remote client to remotely view the status of a projection device.

FIG. 13 shows a communication log view 1302 of projection-device-status user interface 132. As discussed above, a communication log may be presented at a remote client to permit a user/administrator to view operation-and-control activity of the projection device remotely. Communication log view 1302 may include a list of events 1304 ordered by time stamps 1306 indicating when each event occurred. Example events that may be entries in list of events 1304 include startup of the server subsystem of the projection device, log-on/log-off of a user/administrator to the projection-device-status user interface, generation/sending of reminders/warnings/errors notifications, adjustment of a projection device setting or state of the projection device, and initiation/completion of a scheduled operation control task. By displaying operation activity and other events of a specified projection device, operation may be easily monitored remotely to determine if maintenance is to be performed on a projection device.

Figure 14:
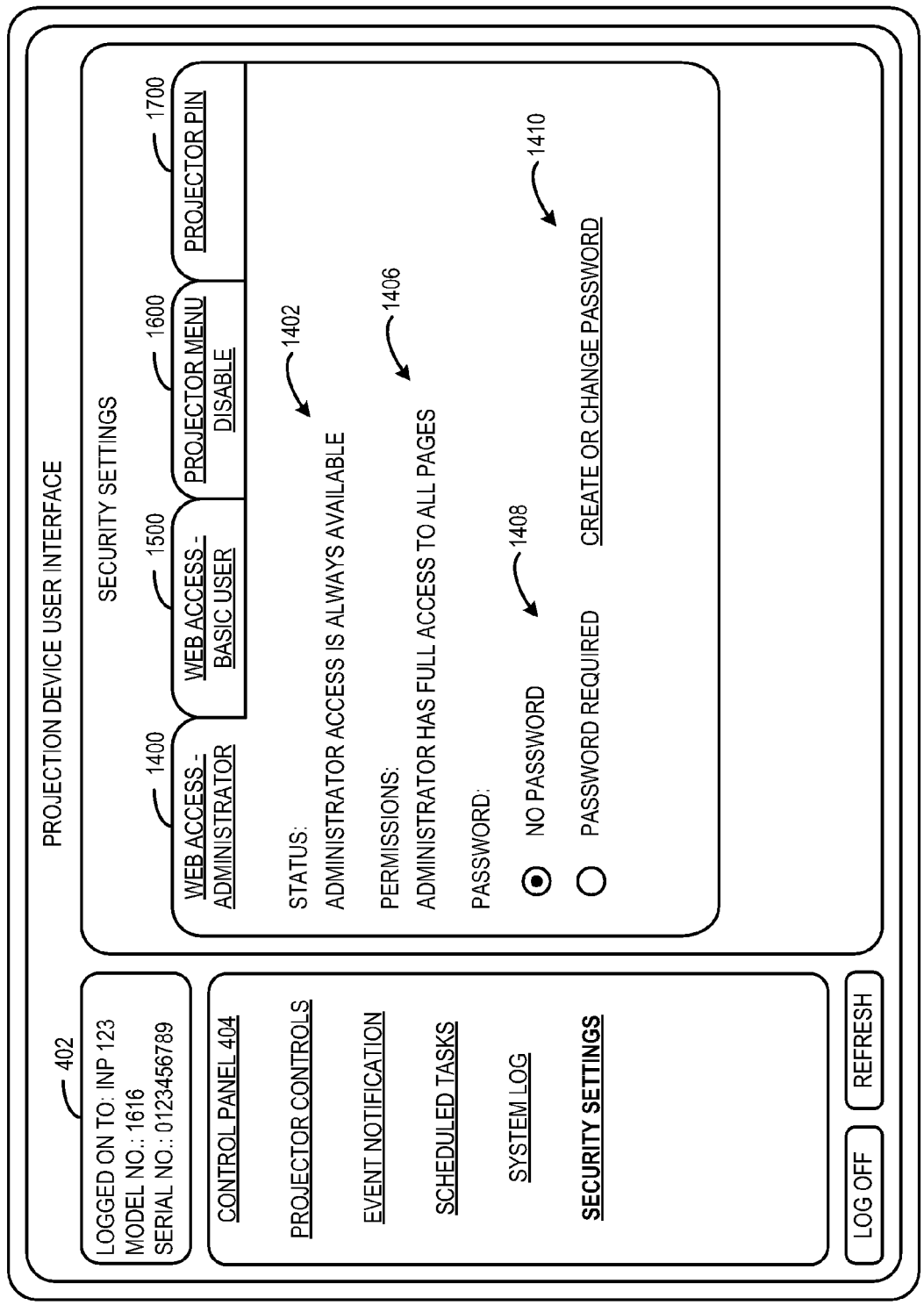
FIG. 14 shows an example web access-administrator view of a projection-device-status user interface that may be served to a remote client to adjust administrator security settings.

FIGS. 14-17 show operation-specific views of projection-device-status user interface 132 corresponding to security settings for remote access to a projection device. In particular, security settings views may include a web access-administrator tab 1400, a web access-basic user tab 1500, a projector menu disable tab 1600, and a projector PIN tab 1700. FIG. 14 shows a view of a web access-administrator tab 1400 of projection-device-status user interface 132 in which remote client input may be entered to adjust administrative access to a projection device. Web access-administrator tab 1400 may include administrator-access-status information 1402 that provides the current status of the administrator's access to projection-device-status user interface 132. For example, the administrator may always have access to the projection-device-status user interface. As another example, the administrator may have access to the projection-device-status user interface, unless a specified projection device is currently in-use or being maintained. Administrator-access-permission information 1402 that provides the current administrator's permissions to projection-device-status user interface 132. In other words, the views and commands of the interface that may be accessed and manipulated by an administrator. Password selectors 1408 may be toggled to activate/deactivate administrator password protection at projection device login view 300. Change password link 1410 may cause a view to be displayed in which a sequence of commands may be followed to change an administrator password for login.

Figure 15:
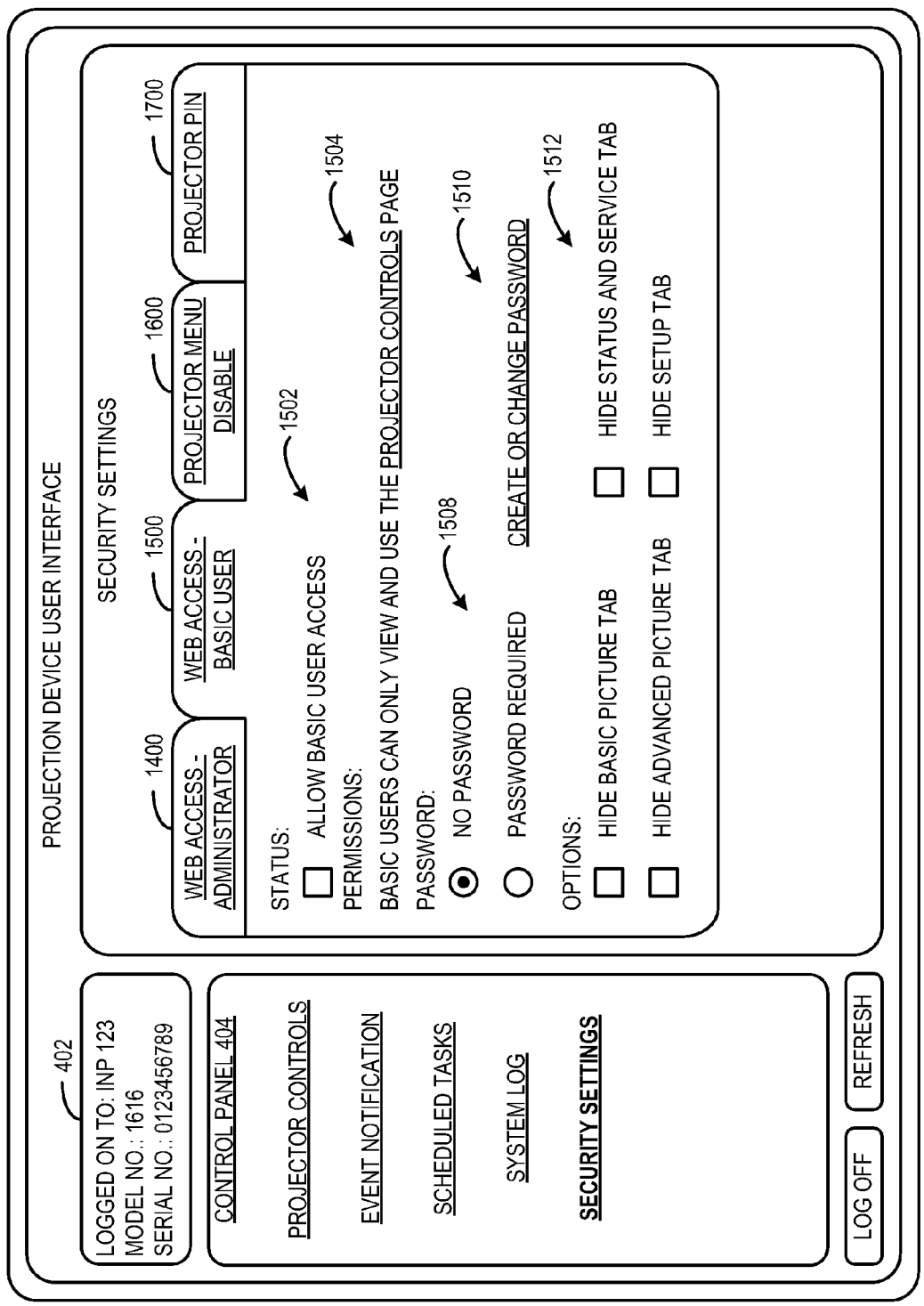
FIG. 15 shows an example web access-basic user view of a projection-device-status user interface that may be served to a remote client to adjust basic user security settings.

FIG. 15 shows a view of a web access-basic user tab 1500 of projection-device-status user interface 132 in which remote client input may be entered to adjust basic user access to a projection device. Web access-basic user tab 1500 may include a basic user status selector 1502 that may be toggled to allow/disallow access to projection-device-status user interface 132. Basic user permission information 1504 displays which views of the projection-device-status user interface that a basic user may access. Password selectors 1508 may be toggled to activate/deactivate basic user password protection at projection device login view 300. Change password link 1510 may cause a view to be displayed in which a sequence of commands may be followed to change a basic user password for login. Basic user options selectors 1512 may be selected to hide various operation-specific views of the projection-device-status user interface from a basic user. In particular basic user options selectors 1512 include a hide basic picture tab selector, a hide advanced picture tab selector, a hide status and service tab selector, and a hide setup tab selector.

Figure 16:
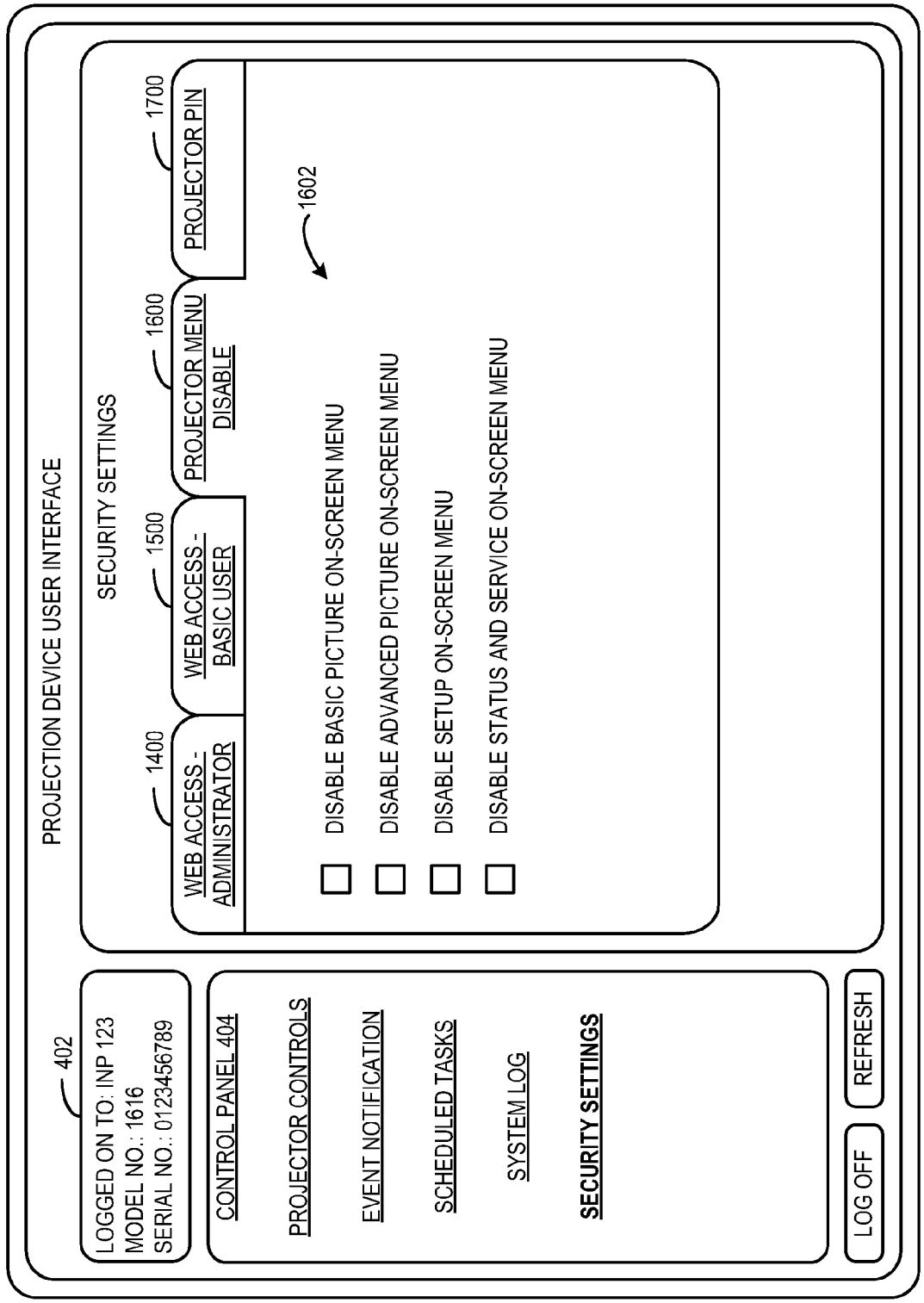
FIG. 16 shows an example projector menu disable view of a projection-device-status user interface that may be served to a remote client to toggle various views from a shown state to a hidden state.

FIG. 16 shows a view of a projector menu disable tab 1600 of projection-device-status user interface 132 in which remote client input may be entered to adjust presentation of projection device control tabs of the projection-device-status user interface. Projector menu disable tab 1600 includes disable menu selectors 1602 that may be toggled via remote client input to disable various operation-specific views of the projection-device-status-user interface from being displayed. In particular, disable menu selectors 1602 may include a disable basic picture on-screen menu selector, a disable advanced picture on-screen menu selector, a disable setup on-screen menu selector, and a disable status and service on-screen menu selector. These menus may be selectively disable from being displayed to prevent users from adjusting the setting within these menus as deemed appropriate be an administrator. Further, these menus may be selectively disabled to simplify the presentation of the user interface.

Figure 17:
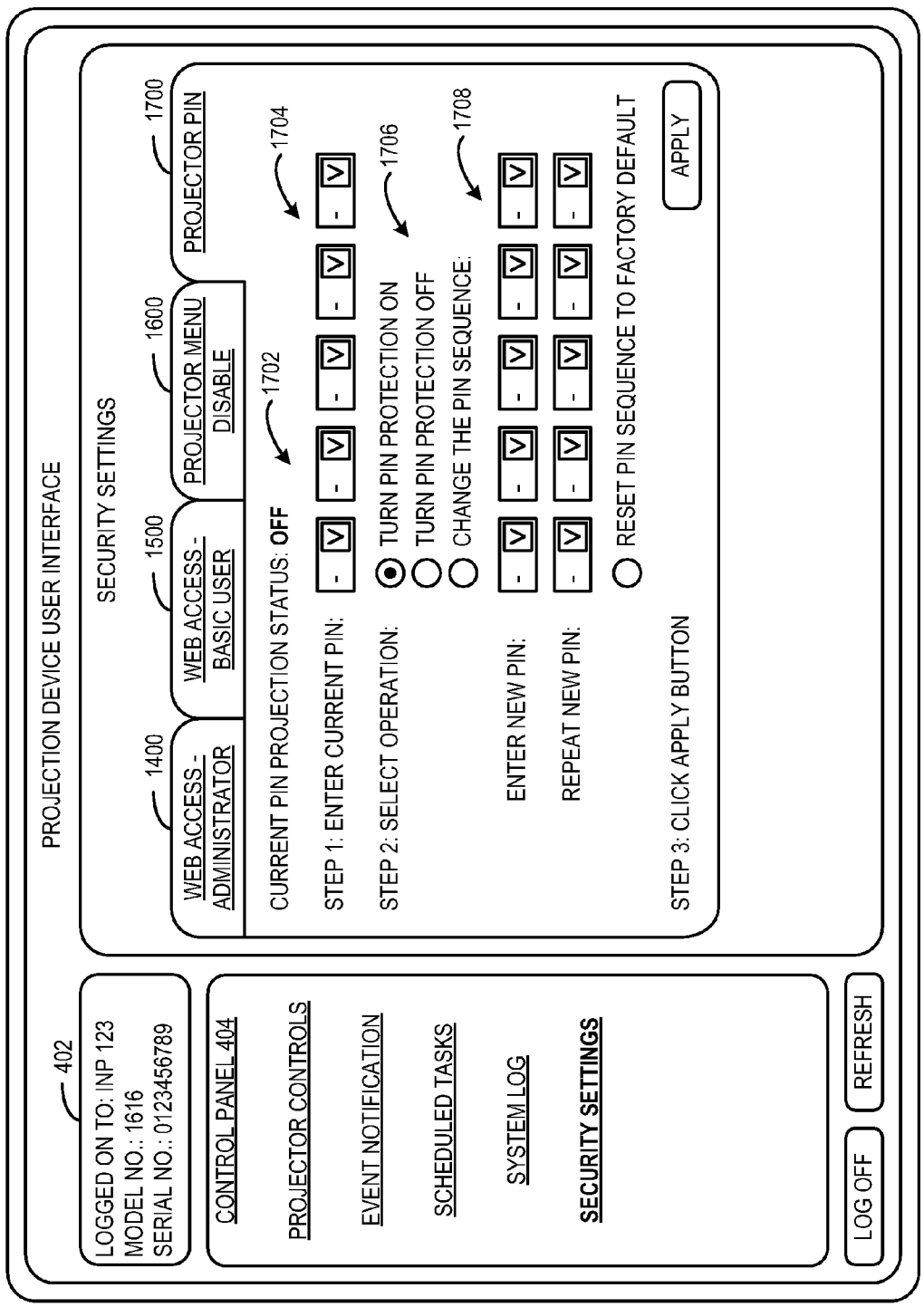
FIG. 17 shows an example projector pin view of a projection-device-status user interface that may be served to remote client to change a security PIN of a projection device.

FIG. 17 shows a view of a projector PIN tab 1700 of projection-device-status user interface 132 in which remote client input may be entered to activate/deactivate/change a PIN protection status of a projection device. A protective PIN may be activated for a projection device such that when the correct PIN sequence must be entered using a projection device keypad or remote controller in order to operate the projection device. Projector PIN tab 1700 includes projector PIN status information 1702 that provides the current status of the PIN (e.g., ON or OFF). Projector PIN tab 1700 includes a sequence of operations that may be performed to change a state of a projection device PIN. Set PIN selectors 1704 may be populated with numbers to set a PIN that may be entered to permit operation a projection device. Change PIN selectors 1706 may be toggled to change the operation status of the PIN (e.g., ON. OFF, change PIN, reset to factory default). Change PIN selectors 1708 may be populated with numbers to change an existing PIN. By allowing a PIN to be set for a projection device via the projection-device-status user interface 132 an administrator may perform protective measures so that a projection device may only be used by appropriate operators without having to be physically at the projection device.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A projection device comprising:
a server subsystem configured to generate a projection-device-status user interface presentable to a remote client via a webpage served by the server subsystem, the server subsystem including:
a processing unit;
a projection control module configured to adjust a projection setting of the projection device based on control input received from the remote client via the projection-device-status user interface;
a task scheduling module configured to schedule a projection device operation control task to be performed at a scheduled event specified by scheduling input received from the remote client via the projection-device-status user interface, and to automatically initiate the projection device operation control task responsive to occurrence of the scheduled event,
wherein the control module is further configured to determine access permissions of the remote client to the projection-device-status user interface;
wherein the control module is further configured, in response to determining that the access permissions of the remote client are of a certain level, to set a PIN for allowing in-person operational access to the projection device based on receiving a security setting input from the remote client via the projection-device-status user interface; and
wherein the control module is further configured to set a PIN operation status for the PIN based on receiving the security setting input from the remote client via the projection-device-status user interface.

2. The projection device of claim 1, wherein the scheduling input includes a frequency and a time that defines at least one moment when the scheduled event occurs.

3. The projection device of claim 1, wherein the projection device operation control task includes a plurality of projection device control commands, and the task scheduling module is further configured to initiate the plurality of projection device control commands according to a command sequence designated by the scheduling input.

4. The projection device of claim 3, wherein the projection device control commands include at least one of powering on the projection device, powering off the projection device, and setting a video source of the projection device to a specified source.

5. The projection device of claim 1, wherein the scheduling input includes an activation state of the operation control task, and wherein the projection device operation control task is selectively initiated based on the activation state.

6. The projection device of claim 1, wherein the server subsystem further comprises:
a notification module configured to send a notification, via electronic mail, to an address of a recipient designated by notification input received from the remote client via the projection-device-status user interface in response to a notification event, the notification including event-specific information and projection device status information.

7. The projection device of claim 6, wherein the notification event is one of a plurality of selectable events presented at the remote client via the projection-device-status user interface.

8. The projection device of claim 6, wherein the notification event includes at least one of adjustment of the projection setting and initiation of the projection device operation control task.

9. The projection device of claim 1, wherein the control module is further configured to:
receive a local PIN entry from the projection device;
determine that the local PIN entry matches the PIN; and
allow in-person operational access to the projection device based on the determination that the PIN entry matches the PIN, and
after the allowance for in-person operational access, determine one of satisfaction and dissatisfaction of the projection device operation control task.

10. A method for providing remote control of a projection device, the method comprising, at a projection device including a server subsystem configured to generate a projection-device-status user interface presentable to a remote client via a webpage served by the server subsystem:
receiving scheduling input from the remote client via the projection-device-status user interface;
scheduling a projection device operation control task to be performed at a scheduled event specified by the scheduling input;
initiating the projection device operation control task responsive to occurrence of the scheduled event;
in response to completion of the projection device operation task, generating a notification including event-specific information and projection device status information;
sending the notification to a recipient designated by remote client input via the projection-device-status user interface,
determining access permissions of the remote client to the projection-device-status user interface;
in response to determining that the access permissions of the remote client are of a certain level, setting a PIN for allowing in-person operational access to the projection device based on receiving a security setting input from the remote client via the projection-device-status user interface; and
setting a PIN operation status for the PIN based on receiving the security setting input from the remote client via the projection-device-status user interface.

11. The method of claim 10, further comprising:
in response to failure of the projection device operation task, generating a warning-type notification indicating that the scheduled task was not completed; and
sending the warning-type notification to the recipient.

12. The method of claim 11, further comprising:
in response to failure of the projection device operation control task due to a failure of a projection device component, generating an error-type notification identifying at least one of the projection device component and a failure condition; and
sending the error-type notification to the recipient.

13. The method of claim 12, wherein the error-type notification is selected from the group consisting of projection lamp failed to turn on, projection lamp unexpectedly went out, projector fan failure, and projection device over temperature.

14. The method of claim 10, wherein the notification is sent to a specified address of the recipient via electronic mail.

15. The method of claim 10, further comprising:
receiving notification input from the remote client via the projection-device-status user interface, the notification input including at least one selection of a notification event; and
generating a notification including event-specific information and projection device status information in response to occurrence of the notification event; and
sending the notification to the recipient.

16. The method of claim 15, wherein the notification input further includes a reminder duration based on the selection including at least one reminder-type notification event; and wherein the notification event occurs upon exceeding the reminder duration.

17. The method of claim 16, wherein the at least one reminder-type notification is selected from the group consisting of a clean lamp screen reminder, replace lamp reminder, lamp lifetime reminder, and a warranty expiration reminder.

18. The method of claim 10, further comprising:
receiving control input from the remote client via the projection-device-status user interface;
adjusting a projection setting of the projection device based on the control input;
generating a notification indicating the projection setting; and
sending the notification to the recipient.

19. The method of claim 10, further comprising:
presenting, via the projection-device-status user interface, a communication log of scheduled tasks initiated and notifications sent.

20. The method of claim 10, further comprising:
receiving a local PIN entry from the projection device;
determining that the local PIN entry matches the PIN;
allowing in-person operational access to the projection device based on the determination that the local PIN entry matches the PIN, and
after the allowance for in-person operational access, determining one of satisfaction and dissatisfaction of the projection device operation control task.

21. A method for providing projection device status information, the method comprising, at a projection device including a server subsystem configured to generate a projection-device-status user interface served to a remote client via a webpage:

receiving an event selection from the remote client via the projection-device-status user interface, the event selection specifying at least one notification event to be monitored for notification, each notification event being classified according to one of a plurality of notification-types;

receiving a designation of at least one recipient from the remote client via the projection-device-status user interface, the designation specifying at least one notification-type to be sent to the recipient;

in response to each notification event being monitored based on the event selection, generating a notification having projection device status information corresponding to the notification event;

sending the notification to the at least one recipient in response to a notification event corresponding to the notification being of the notification-type designated for the recipient;

determining access permissions of the remote client to the projection-device-status user interface;

in response to determining that the access permissions of the remote client are of a certain level, setting a PIN for allowing in-person operational access to the projection device based on receiving a security setting input from the remote client via the projection-device-status user interface; and setting a PIN operation status for the PIN based on receiving the security setting input from the remote client via the projection-device-status user interface.

22. The method of claim 21, wherein the designation includes a plurality of different recipients each having a different notification-type.

23. The method of claim 21, further comprising:

receiving a local PIN entry from the projection device via entry by the at least one recipient;

determining that the local PIN entry matches the PIN; and allowing the at least one recipient in-person operational access to the projection device based on the determination that the local PIN entry matches the PIN; and after the allowance for in-person operational access to the at least one recipient, determine one of satisfaction and dissatisfaction of an operational control task related to the notification sent to the at least one recipient.

* * * * *